(12) United States Patent
Wang et al.

(10) Patent No.: US 9,109,328 B2
(45) Date of Patent: Aug. 18, 2015

(54) STEEL CORD COMPRISING FLAT WIRES

(75) Inventors: Pengfei Wang, Jiangyin (CN); Zhichao Cheng, Jiangyin (CN); Jiankao Chen, Jiangyin (CN); Yiwen Luo, Shanghai (CN)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 14/124,921

(22) PCT Filed: May 3, 2012

(86) PCT No.: PCT/EP2012/058074
§ 371 (c)(1),
(2), (4) Date: Dec. 9, 2013

(87) PCT Pub. No.: WO2012/168007
PCT Pub. Date: Dec. 13, 2012

(65) Prior Publication Data
US 2014/0099515 A1     Apr. 10, 2014

Related U.S. Application Data

(63) Continuation of application No. PCT/CN2011/075573, filed on Jun. 10, 2011.

(30) Foreign Application Priority Data

Jun. 10, 2011   (WO) ................ PCT/CN2011/075573

(51) Int. Cl.
*D07B 1/06*     (2006.01)
*D02G 3/48*    (2006.01)
*B60C 9/00*    (2006.01)

(52) U.S. Cl.
CPC .............. *D07B 1/062* (2013.01); *B60C 9/0007* (2013.04); *D02G 3/48* (2013.01);
(Continued)

(58) Field of Classification Search
CPC ........ D07B 1/062; D02G 3/48; B60C 9/0007; B60C 9/005
USPC ...................................... 57/210, 212
See application file for complete search history.

(56) References Cited

U.S. PATENT DOCUMENTS 1,774,748 A * 9/1930 Gore ............................. 245/1.5
3,402,546 A * 9/1968 Peene ............................ 57/236
(Continued)

FOREIGN PATENT DOCUMENTS

JP   61-174486 A   8/1986
JP   10-236107 A   9/1998
(Continued)

OTHER PUBLICATIONS

Anonymous: "Micro-alloyed steel cord constructions for tyres", *Mason Publications*, vol. 349, No. 84, May 1, 1993 (25 pages).

*Primary Examiner* — Shaun R Hurley
(74) *Attorney, Agent, or Firm* — Foley & Lardner LLP

(57) ABSTRACT

A steel cord (20) comprises a plurality of steel filaments (22, 24) arranged in parallel to the longitudinal axis of the steel cord (20) without twisting. The steel cord (20) further comprises a wrapping filament (26) twisted around the steel cord (20). Each of said steel filaments (22, 24) is a flat wire having flat surfaces. The steel filament (24) near the center of the steel cord (20) has a bigger width than the steel filaments (22) further away from the center of the steel cord (20) such that the cross-section of said steel cord (20) approximates an oval shape with the bending stiffness around the shorter axis of the oval shape being greater than the bending stiffness around the longer axis. In a tire, the steel cord being used as a reinforcement, the longer axis being arranged perpendicular to the radial direction of the tire.

10 Claims, 1 Drawing Sheet

(52) U.S. Cl.
CPC ............... *D07B 2201/2003* (2013.01); *D07B 2201/2011* (2013.01); *D07B 2201/2018* (2013.01); *D07B 2201/2033* (2013.01); *D07B 2201/2098* (2013.01); *D07B 2205/2046* (2013.01); *D07B 2205/3035* (2013.01); *D07B 2205/3089* (2013.01); *D07B 2501/2007* (2013.01); *D07B 2501/2046* (2013.01); *D07B 2501/2076* (2013.01); *D10B 2331/02* (2013.01); *Y10T 428/12333* (2015.01); *Y10T 428/2936* (2015.01)

(56) References Cited

U.S. PATENT DOCUMENTS

| | | | |
|---|---|---|---|
| 4,544,603 A | 10/1985 | Richards | |
| 4,546,031 A * | 10/1985 | Richards | 428/222 |
| 4,606,392 A | 8/1986 | Weidenhaupt et al. | |
| 4,718,224 A * | 1/1988 | Obata | 57/212 |
| 4,733,708 A * | 3/1988 | Kindry et al. | 152/527 |
| 6,009,699 A * | 1/2000 | Delvael | 57/232 |
| 6,273,161 B1 * | 8/2001 | Yamagami et al. | 152/527 |
| 6,412,263 B1 * | 7/2002 | Lee et al. | 57/210 |
| 7,063,116 B2 * | 6/2006 | Miyazaki et al. | 152/527 |
| 8,407,977 B2 * | 4/2013 | Cheng et al. | 57/212 |
| 8,720,175 B2 * | 5/2014 | Rodriguez et al. | 57/212 |
| 2004/0226641 A1* | 11/2004 | Akiyama et al. | 152/451 |
| 2011/0197564 A1* | 8/2011 | Zachariades et al. | 57/210 |
| 2011/0290397 A1* | 12/2011 | Rodriguez et al. | 152/526 |
| 2012/0177940 A1* | 7/2012 | Cheng et al. | 428/592 |

FOREIGN PATENT DOCUMENTS

| | | |
|---|---|---|
| JP | 2001-181989 A | 7/2001 |
| WO | WO 2012/011143 A1 | 1/2012 |

\* cited by examiner

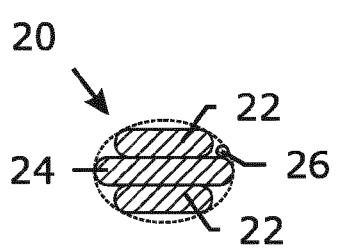
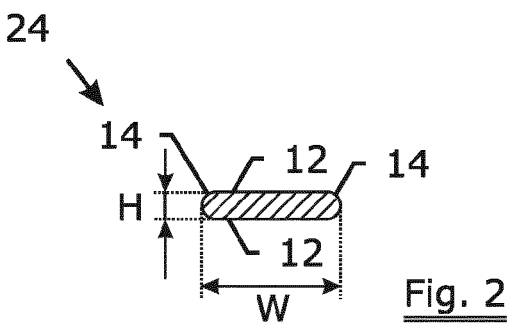
Fig. 1
Fig. 2
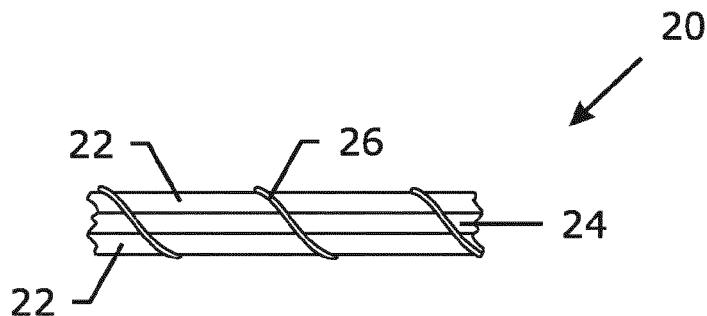
Fig. 3
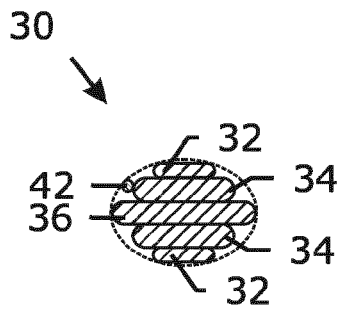
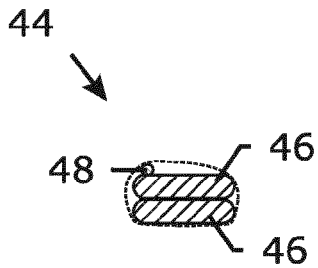
Fig. 4
Fig. 5
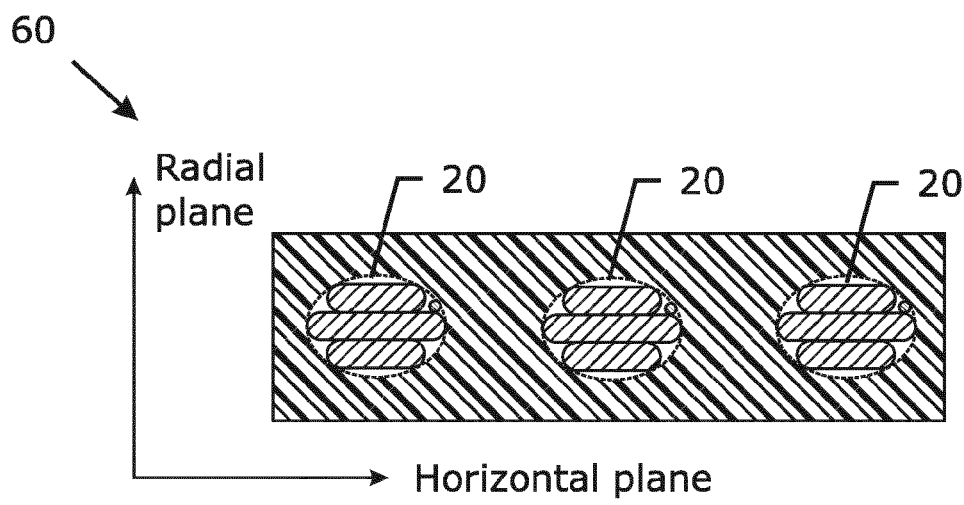
Fig. 6

STEEL CORD COMPRISING FLAT WIRES

TECHNICAL FIELD

The present invention is relating to a steel cord, particular for reinforcing rubber product.

The present invention is relating to a rubber product reinforced by steel cord.

BACKGROUND ART

A steel cord with different bending stiffness in different directions, i.e. lateral bending stiffness in horizontal plane and radial bending stiffness in vertical axis, has a good advantage in comparison with a normal steel cord with same bending stiffness in the different directions. While applying such steel cord in rubber product, i.e. rubber tyre, the different bending stiffness in different direction leads to a good handling, riding comfort or driving stability. In a direction perpendicular to the horizontal axis of the steel cord, there is a decreased radial bending stiffness and an increased flexibility so that any obstacles such as cobble stones on the road can be taken easily. In the direction of the horizontal axis of the steel cord, there is an increased lateral bending stiffness and a decreased flexibility leading to an improved stability when taking a bend.

Normally the present steel cord with different bending stiffness in different direction is produced as the steel cord with oval cross-section or rectangular cross-section.

U.S. Pat. No. 4,544,603 discloses a steel cord having a lateral bending stiffness in a horizontal plane different from the radial bending stiffness in a vertical plane. This steel cord has several steel filaments overlapped with each other. The steel filaments are flat wires having substantially rectangular cross-section with round edges. Because the steel filaments have the same cross-section dimension, the steel cord has a cross-section of rectangular form. While embedding the steel cord into rubber for reinforcing rubber product, this rectangular cross-section has a disadvantage. When the steel cord is embedded into the rubber, use is made of an extruding or calendaring operation. This extruding of calendaring operation makes use of an extrusion die which is mostly round. In other words, the cross-section of hole in the extrusion die is round. Now, the steel cord with a rectangular cross-section can not fit the extrusion die with round cross-section. As a result, the steel cord will turn over or twist during the extrusion or calendaring process, and the rigid edges of the steel cord will damage the extrusion die. An optional solution is using other extrusion die with a rectangular cross-section. Because this rectangular extrusion die is not a normal or general die, it is more expensive than round die, the solution of using extrusion die with a rectangular cross-section will increase the production cost.

U.S. Pat. No. 4,606,392 also discloses a steel cord for reinforcing element comprising several flat wires twisted together. Because of this twisting of the steel cord, the steel cord has a substantially round cross-section. The steel cord can fit the normal extrusion die with round cross-section, but the difference between the lateral bending stiffness and radial bending stiffness is not existing. While using the rubber tyre with such steel cord, the handling and riding comfort is not different from other steel cords with round cross-section.

DISCLOSURE OF INVENTION

It is an object of the present invention to overcome the drawbacks of the prior arts.

It is also an object of the present invention to provide a steel cord with substantially round cross-section.

It is a further object of the present invention to provide a rubber product reinforced by the steel cord.

According to the present invention, a steel cord comprises a plurality of steel filaments arranged in parallel without twisting. The steel cord further comprises a wrapping filament twisted around the steel filaments. The steel filaments are flat wires having flat surfaces and preferably round edges. The steel filaments are contacted with each other along the flat surfaces. The cross-section of the steel cord is substantially round. The lateral bending stiffness (in a horizontal plane) is greater than the radial bending stiffness (in a vertical plane).

The cross-section of the steel cord is substantially round. While embedding the steel cord into rubber, the steel cord with substantially round cross-section fits the normal extrusion die with round cross-section well, and the extrusion die would not be damaged by the steel cord. It is not necessary to make special extrusion die to adapt for the steel cord. The additional cost for special extrusion die is saved. So the steel cord according to the invention combines the advantages of a round cross-section with the advantages of having a different radial and lateral stiffness.

According to the present invention, 'substantially round' is a cross-section being nearly round but not round, and the arc line in the cross-section is nearly round. In any one cross-section along the length of steel cord, because of the non-round cross-section, the diameter has a maximum value to be maximum diameter, a minimum value to be minimum value, and an average value to be average diameter. To the present invention, 'substantially round' means that, the ratio of the difference between maximum diameter and minimum diameter to the average diameter ranges from 5% to 15%. For example, to a steel cord with an average diameter being 1 mm, the difference between maximum diameter and minimum value is between 0.05 and 0.15 mm, such steel cord has substantially round cross-section. All these make the shape of cross-section of the steel cord to be nearly round but not round.

The lateral bending stiffness (in a horizontal plane) is greater than the radial bending stiffness (in a vertical plane). Preferably the ratio of the lateral bending stiffness to the radial bending stiffness is not less than 1.8. More preferably the ratio of the lateral bending stiffness to the radial bending stiffness is not less than 2.0. The steel cord with different bending stiffness in different plane is quite adapting for reinforcing rubber ply in tyre. The steel cord will take good advantages on handling and riding comfort to the rubber tyre.

In the context of the present invention, a horizontal plane is the plane which is parallel to the flat surface of the steel filament, and a vertical plane is the plane which is perpendicular to the flat surface of the steel filament.

According to the present invention, the steel filaments in the steel cord are flat wires. Flat wire here means a wire with flat cross-section having a pair of flat surface and, preferably, a pair of round edges.

To obtain a steel cord with substantially round cross-section, the flat wires are laid to overlap with each other along the flat surface to make a strand, and then bundle the strand by twisting a wrapping wire around it.

The flat wires are laid according to the following geometry. The wider flat wire is laid in the center of the steel cord, and the narrower flat wire is laid away from the center of the steel cord. In other words, the steel filament near the centre of the steel cord has the bigger width, and the steel filament away from the centre of the steel cord has the smaller width. As a result, a steel cord with a substantially round cross-section is obtained.

The steel filaments in the steel cord may have the same cross-section area or different cross-sectional area.

Preferably, the steel filament near the centre of the steel cord has the bigger thickness, and the steel filament away from the centre of the steel cord has the smaller thickness, and thereby the steel filament near the centre of the steel cord has the bigger cross-sectional area, and the steel filament away from the centre of the steel cord has the smaller cross-sectional area.

The number of the steel filaments in the steel cord preferably ranges from 3 to 9.

To obtain a stable steel cord, the strand consisting of a plurality steel filaments with flat cross-section is twisted by a wrapping filament. The wrapping filament can be any one of the prior existing warp filaments with various cross-sections or various materials. The wrapping filament may be a wire with round, flat or rectangular cross-section. And the wrapping filament can be made from metal, metal alloy or nylon. Preferably the wrapping filament can be made of steel. For the wrapping filament made from nylon, while being embedded into rubber, the nylon wrapping filament will disperse into rubber, as a result there is no wrapping filament twisted around the steel stand in the final rubber product. In this case, the definition of substantially round is also applied to the strand of steel filaments.

According to the size of the steel filament, preferably the steel cord has a diameter ranging from 0.2 mm to 15 mm.

The steel cord in the present invention can be embedded into rubber as a reinforcing element for rubber product. According to the diameter of the steel cord, the steel cord can be applied to various applications. For the steel cord with a diameter ranging from 0.2 mm to 5.0 mm, the steel cord can be applied to reinforce rubber belt in tyre for passenger car or rubber track tyre. For the steel cord with a diameter ranging from 0.2 mm to 1.2 mm, the steel cord can be used for reinforcing timing belt. For the steel cord with large diameter ranging from 4.0 mm to 13 mm, the steel cord can be applied to reinforcing the rubber belt for elevator.

BRIEF DESCRIPTION OF FIGURES IN THE DRAWINGS

FIG. 1 shows a cross-sectional view of an invention steel cord;

FIG. 2 shows a cross-sectional view of a flat wire;

FIG. 3 shows a side view of a invention steel cord;

FIG. 4 shows a cross-sectional view of an invention steel cord;

FIG. 5 shows a cross-sectional view of prior art steel cord;

FIG. 6 shows a cross-sectional view of rubber belt embedded with invention steel cords.

MODE(S) FOR CARRYING OUT THE INVENTION

The steel cord comprises a plurality of steel filaments and a wrapping filament. In the present invention, both the steel filaments and wrapping filament can be manufactured from a wire rod in the following process.

The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter d1, e.g. at about 3.0 to 3.5 mm, the dry drawn steel wire is subjected to a first intermediate heat treatment, called patenting. Patenting means first austenitizing until a temperature of about 1000° C. followed by a transformation phase from austenite to pearlite at a temperature of about 600° C.-650° C. The steel wire is then ready for further mechanical deformation.

Thereafter the steel wire is further dry drawn from the first intermediate diameter d1 until a second intermediate diameter d2 in a second number of diameter reduction steps. The second diameter d2 typically ranges from 1.0 mm to 2.5 mm.

At this second intermediate diameter d2, the steel wire is subjected to a second patenting treatment, i.e. austenitizing again at a temperature of about 1000° C. and thereafter quenching at a temperature of 600° C. to 650° C. to allow for transformation to pearlite.

If the total reduction in the first and 2nd dry drawing step is not too big a direct drawing operation can be done from wire rod till diameter d2.

After this second patenting treatment the steel wire is usually provided with a brass coating: copper is plated on the steel wire and zinc is plated on the copper. A thermo-diffusion treatment is applied to form the brass coating.

The brass-coated steel wire is then subjected to a final series of cross-section reductions by means of wet drawing machines. The final product is a steel filament with a carbon content above 0.60 percent by weight, with a tensile strength typically above 2000 MPa and adapted for the reinforcement of elastomeric products.

Steel filaments adapted for the reinforcement of tyres typically have filaments with a final diameter ranging from 0.05 mm to 0.60 mm, e.g. from 0.10 mm to 0.40 mm. Examples of filament diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm.

Of course, the steel filaments may have big diameters like 4 mm to 13 mm for other applications such as belt for elevator.

Then steel filaments are rolled by a pair of rollers to change the cross-section from round to flat. Thus flat wires are obtained. The flat wires have a pair of flat surfaces and a pair of round edges.

For a wrapping filament, it can be a steel filament having round cross-section or flat cross-section.

FIG. 1 illustrates an invention steel cord. The steel cord 20 is consisting of three flat wires (22, 24, 22) and a wrapping filament 26. FIG. 2 illustrates a flat wire. The flat wire 24 has a pair of flat surfaces 12 and a pair of round edges 14. The flat wire 24 has a width W and a thickness H. FIG. 3 is the side view of the steel cord 20. The width W of flat wire 24 is 0.72 mm, and the width W of flat wire 22 is 0.38 mm. The thickness H of flat wire 24 is 0.26 mm, and the thickness H of flat wire 22 is 0.17 mm. The wrapping filament 26 is a round steel filament. The average diameter of the steel cord 20 is 0.96 mm, the maximum diameter of the steel cord 20 is 1 mm, and the minimum diameter of the steel cord 20 is 0.91 mm. The ratio of difference between the maximum diameter and the minimum diameter to the average diameter is 9.4%. So the steel cord 20 has a substantially round cross-section. The lateral bending stiffness is 1363 N×mm², and the radial bending stiffness is 603 N×mm². The ratio of lateral bending stiffness to the radial bending stiffness is 2.26.

FIG. 4 illustrates an invention steel cord. The steel cord 30 is consisting of five flat wires (32, 34, 36, 34, 32) and a wrapping filament 42. The wrapping filament 42 is a round steel filament. The average diameter of the steel cord 30 is 2.60 mm, the maximum diameter of the steel cord 30 is 2.75 mm, and the minimum diameter of the steel cord 30 is 2.45 mm. The ratio of difference between the maximum diameter and the minimum diameter to the average diameter is 11.5%. So the steel cord 30 has a substantially round cross-section. The lateral bending stiffness is 8701 N×mm$^2$, and the radial bending stiffness is 4507 N×mm$^2$. The ratio of the lateral bending stiffness to the radial bending stiffness is 1.93.

FIG. 5 illustrates a prior art steel cord 44. The prior art steel cord 44 is consisting of two flat wires 46 and one wrapping filament 48. The two flat wires 46 have the same width W of 0.58 mm and same thickness H of 0.25 mm. The average diameter of the prior art steel cord 44 is similar with the invention steel cord 20. The tensile strength of steel cord 44 is close to the tensile strength of the invention steel cord 20. In one cross-section of the steel cord 44, the maximum diameter is 1 mm, the minimum diameter is 0.8 mm, and the average diameter is 0.9 mm. So the ratio of difference between maximum diameter and minimum diameter to the average diameter is 22%. The cross-section of the prior art steel cord 44 is not substantially round. The edges of the steel cord are rigid but not arcs.

A comparison test between the invention steel cord 20 and prior steel cord 44 is carried out, and the following Table 1 summarizes the result.

TABLE 1

|  | Invention steel cord 20 | Prior art steel cord 44 |
|---|---|---|
| Lateral bending stiffness (%) | 100 | 102 |
| Radial bending stiffness (%) | 100 | 177 |
| Lateral bending stiffness/ Radial bending stiffness | 2.26 | 1.30 |
| Tensile strength (%) | 100 | 100 |
| Substantially round cross-section | Yes | No |

According to table 1, although the prior art steel cord 44 has the same tensile strength as the invention steel cord 20, the invention steel cord has a greater improvement on the difference between lateral bending stiffness and radial bending stiffness. The ratio of lateral bending stiffness to radial bending stiffness in invention steel cord 20 is nearly two times more of it in prior steel cord 44. While keeping the same tensile strength, the invention steel cord has a greater advantage than the prior art steel cord, the invention steel cord is more suitable for reinforcing rubber product which requires different bending stiffness in different direction. Furthermore, the invention steel cord has substantially round cross-section which is quite fitting for the normal round extrusion die in the further process.

Another prior art steel cord A has the same structure with prior art steel cord 44 being consisting of two flat wires and a wrapping filament. The two flat wires have the same width of 0.42 mm and same thickness of 0.28 mm. In a cross-section of the steel cord A, the maximum diameter is 0.95 mm, the minimum diameter is 0.67 mm, the average diameter is 0.81 mm, and the ratio of diameter difference between maximum value and minimum value to the average diameter is 34.6%. The cross-section of the prior steel cord A is not substantially round.

A comparison test between the steel cord 20 and prior steel cord A is carried out, and the following Table 2 summarizes the result.

TABLE 2

|  | Invention steel cord 20 | Prior art steel cord A |
|---|---|---|
| Lateral bending stiffness (%) | 100 | 100 |
| Radial bending stiffness (%) | 100 | 115 |
| Lateral bending stiffness/ Radial bending stiffness | 2.26 | 1.96 |
| Tensile strength (%) | 100 | 42 |
| Substantially round cross-section | Yes | No |

According to table 2, the tensile strength of the invention steel cord 20 is two times of the tensile strength of the prior art steel cord A, although the ratio of lateral bending stiffness to radial bending stiffness in invention steel cord 20 is similar with it in prior art steel cord A. While keeping the same ratio of lateral bending stiffness to radial bending stiffness, the invention steel cord has a greater advantage than the prior art steel cord on tensile strength, the invention steel cord is more suitable to be a reinforcing element. Furthermore, the invention steel cord has substantially round cross-section which is quite fitting for the normal round extrusion die in the further process.

Both table 1 and table 2 show that the invention steel cord has a great improvement on the difference between lateral bending stiffness and radial bending stiffness or on tensile strength compared with the prior art steel cords. Furthermore, the invention steel cord has substantially round cross-section. As a result, the invention steel cord fits for the existing round extrusion die well, and the invention steel cord is quite suitable for reinforcing rubber product, especially for reinforcing rubber tyre.

FIG. 6 illustrates a rubber belt. The rubber belt 60 is embedded with invention steel cords 20. To the invention steel cords 20, the lateral bending stiffness (in the horizontal plane) is greater than radial bending stiffness (in a radial plane). To the rubber belt 60, the lateral bending stiffness is greater than radial bending stiffness.

To a rubber tyre which has rubber belt 60, a good handling, riding comfort and driving stability are obtained.

The invention claimed is:

1. A steel cord comprising a plurality of steel filaments arranged in parallel without twisting, said steel cord further comprising a wrapping filament twisted around said steel filaments, said plurality of steel filaments being flat wires having flat surfaces, said plurality of steel filaments being in contact with each other along said flat surfaces, the lateral bending stiffness (in a horizontal plane) is greater than the radial bending stiffness (in a vertical plane), wherein the cross-section of said steel cord is substantially round,
   wherein said steel filaments have different cross-sectional areas,
   wherein said steel filament near the center of said steel cord has the bigger cross-sectional area, and said steel filament further away from the center of said steel cord has the smaller cross-sectional area.

2. A steel cord as claimed in claim 1, wherein the ratio of said lateral bending stiffness to said radial bending stiffness is not less than 1.8.

3. A steel cord as claimed in claim 2, wherein the ratio of said lateral bending stiffness to said radial bending stiffness is not less than 2.0.

4. A steel cord as claimed in claim 1, wherein said steel filament near the center of said steel cord has a bigger width, and said steel filament far away from the center of said steel cord has a smaller width.

5. A steel cord as claimed in claim 1, wherein the number of said plurality of steel filaments is between 3 and 9.

6. A steel cord as claimed in claim 1, wherein said wrapping filament is a filament with a flat cross-section or a round cross-section.

7. A steel cord as claimed in claim 1, wherein said wrapping filament is a nylon filament or a metallic filament.

8. A steel cord as claimed in claim 1, wherein said steel cord has a diameter ranging from 0.2 mm to 15 mm.

9. A rubber product comprising the steel cord as claimed in claim 1, wherein the steel cord is arranged as a reinforcing element in the rubber product.

10. A rubber product as claimed in claim 9, wherein said rubber product is a belt for a rubber tire, a timing belt, a rubber track tire or a belt for an elevator.

* * * * *